(12) United States Patent
Kanno

(10) Patent No.: US 12,022,040 B2
(45) Date of Patent: Jun. 25, 2024

(54) IMAGE READING APPARATUS AND IMAGE FORMING APPARATUS WHICH DISPLAYS USER GUIDANCE FOR A MULTI-CROP MODE

(71) Applicant: CANON KABUSHIKI KAISHA, Tokyo (JP)

(72) Inventor: Akiko Kanno, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/074,057

(22) Filed: Dec. 2, 2022

(65) Prior Publication Data

US 2023/0179721 A1 Jun. 8, 2023

(30) Foreign Application Priority Data

Dec. 8, 2021 (JP) ................................ 2021-199605

(51) Int. Cl.
*H04N 1/04* (2006.01)
*H04N 1/00* (2006.01)
*H04N 1/10* (2006.01)

(52) U.S. Cl.
CPC ..... *H04N 1/00809* (2013.01); *H04N 1/00824* (2013.01); *H04N 1/1061* (2013.01)

(58) Field of Classification Search
None
See application file for complete search history.

(56) References Cited

U.S. PATENT DOCUMENTS

| 3,695,754 | A | * | 10/1972 | Washio | G03G 15/28 355/75 |
| 5,090,943 | A | * | 2/1992 | Greig | G09F 3/0288 462/71 |
| 5,192,071 | A | * | 3/1993 | Kodama | G03G 15/605 399/397 |
| 2003/0100354 | A1 | * | 5/2003 | Tomita | B41L 1/22 462/6 |
| 2005/0179960 | A1 | * | 8/2005 | Obana | H04N 1/2338 358/449 |
| 2010/0073739 | A1 | | 3/2010 | Sekiguchi et al. | H04N 1/04 |
| 2010/0128331 | A1 | | 5/2010 | Hamano et al. | H04N 1/46 |
| 2015/0281488 | A1 | * | 10/2015 | Kawauchi | H04N 1/0057 358/1.13 |
| 2017/0126911 | A1 | * | 5/2017 | Kogi | H04N 1/0035 |
| 2017/0374216 | A1 | * | 12/2017 | Kanamitsu | H04N 1/00795 |

(Continued)

FOREIGN PATENT DOCUMENTS

JP 2009-105572 5/2009
JP 2009-177698 8/2009

*Primary Examiner* — Dung D Tran
(74) *Attorney, Agent, or Firm* — Venable LLP

(57) ABSTRACT

An image reading apparatus includes a transparent document platen on which a document is to be placed, a reader configured to read an image of the document placed on the document platen, a controller configured to perform a reading mode to cause the reader to read a document tucked in a storage member, which has a transparent portion and can store the document, in a state in which the storage member in which the document is tucked is placed on the document platen so that the transparent portion contacts the document platen, and a display configured to display, in the reading mode, a screen indicating an orientation in which the storage member is to be placed on the document platen.

10 Claims, 14 Drawing Sheets

(56) References Cited

U.S. PATENT DOCUMENTS

| | | | |
|---|---|---|---|
| 2018/0332183 A1 | 11/2018 | Seki et al. | H04N 1/00 |
| 2019/0199874 A1 | 6/2019 | Oka et al. | H04N 1/00 |
| 2020/0106915 A1* | 4/2020 | Ogino | H04N 1/00551 |
| 2020/0112648 A1 | 4/2020 | Kanno | H04N 1/00 |
| 2020/0322497 A1 | 10/2020 | Kanno | H04N 1/00 |

* cited by examiner

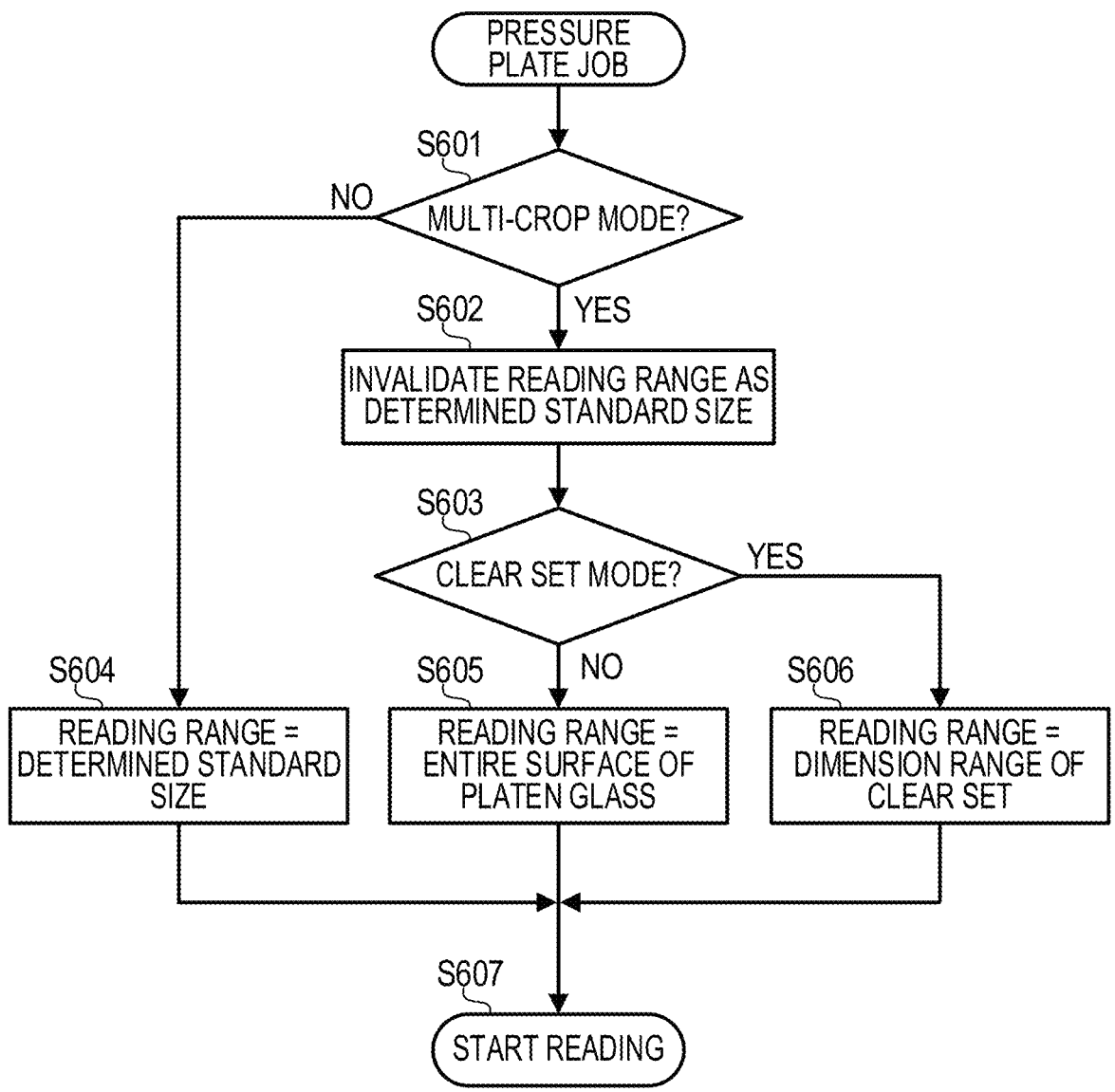

FIG. 9A

| | | W | H | VERTICAL PLACEMENT | HORIZONTAL PLACEMENT |
|---|---|---|---|---|---|
| CORRESPONDING DOCUMENT SIZE | A3 | 310 | 435 | × | △ |
| | B4 | 270 | 375 | × | ○ |
| | A4 | 220 | 310 | × | ○ |
| | B5 | 193 | 271 | ○ | ○ |
| | A5 | 153 | 220 | ○ | ○ |
| | A6 | 110 | 158 | ○ | ○ |

FIG. 9B

| | | W | H |
|---|---|---|---|
| BINDING HOLES | YES | +10 | −5 |
| | NO | 0 | 0 |

FIG. 12A
MULTI-CROP: CLEAR SET MODE
PUT DOCUMENTS IN CLEAR SET AND PLACE IT
CLOSE PRESSURE PLATE AND PRESS START KEY
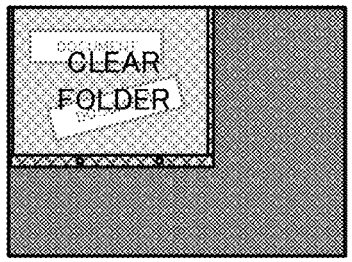 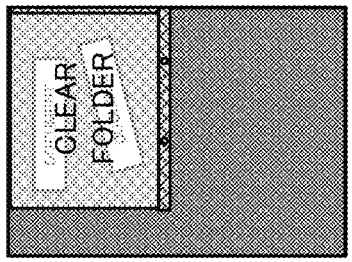
CANCEL  OK
FIG. 12B
MULTI-CROP: CLEAR SET MODE
PUT DOCUMENTS IN CLEAR SET AND PLACE IT IN SHOWN ORIENTATION
CLOSE PRESSURE PLATE AND PRESS START KEY
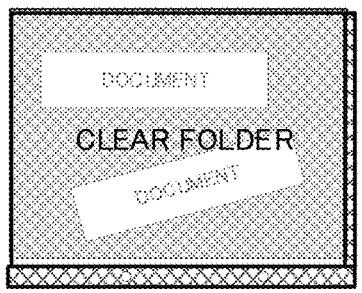
IMAGE MAY BE CUT OFF IF DOCUMENT IS SET
IN LOWER END PORTION OF CLEAR SET
CANCEL  OK

IMAGE READING APPARATUS AND IMAGE FORMING APPARATUS WHICH DISPLAYS USER GUIDANCE FOR A MULTI-CROP MODE

BACKGROUND OF THE DISCLOSURE

Field of the Disclosure

The present disclosure relates to an image reading apparatus and an image forming apparatus.

Description of the Related Art

In recent years, a number of functions (hereinafter referred to as multi-crop functions) to read multiple documents on a platen glass at once and automatically output respective images of documents have been proposed for image reading apparatuses mounted on image forming apparatuses such as copying machines. The multi-crop function allows images of multiple documents to be formed in a single scan. Here, for example, thin and light documents such as receipts and cash register paper may be raised due to their own curls, wrinkles, etc. even though placed on the platen glass, or may be moved due to wind pressure when a pressure plate (platen cover) is closed and pressed, so that it may be difficult to obtain appropriate images of the documents.

Therefore, Japanese Patent Application Laid-Open No. 2009-177698 discloses an image reading apparatus in which a transparent sheet is attached to a pressure plate, and a curl of a document is corrected by sandwiching the document between the transparent sheet and the pressure plate to read the image of the document. Japanese Patent Application Laid-Open No. 2009-105572 discloses that a document is tuck in a transparent document holding member (carrier sheet) and conveyed by an automatic document feeder so that the curled document can be read by an image reading apparatus while being conveyed by the automatic document feeder.

An image of a document to be read may be read by tucking the document in one of document storage supplies (hereinafter referred to as a clear set), such as commercially available clear files or clear pockets, of which at least one side is transparent so that the document can be seen, and placing the one of document storage supplies in which the document is tuck on a platen glass. When the clear set in which the document is tuck is placed on the platen glass with a long side of the clear set laid in a cross feed direction, an outer edge of the clear set may extend beyond a readable range so that an end portion of the document tuck in the clear set may not be read. Also, there is a case in which, before a start of an image reading operation, a document size is determined in advance as one of standard sizes, and an image only within a reading range of the determined standard size may be read. In this case, a portion of a clear set may extend beyond the reading range of the determined standard size, and a range of a document in the clear set may not be correctly recognized.

SUMMARY OF THE DISCLOSURE

According to an embodiment of the disclosure, an image reading apparatus comprises: a transparent document platen on which a document is to be placed; a reader configured to read an image of the document placed on the document platen; a controller configured to perform a reading mode to cause the reader to read a document tucked in a storage member, which has a transparent portion and can store the document, in a state in which the storage member in which the document is tucked is placed on the document platen so that the transparent portion contacts the document platen; and a display configured to display, in the reading mode, a screen indicating an orientation in which the storage member is to be placed on the document platen.

Further features of the present disclosure will become apparent from the following description of exemplary embodiments with reference to the attached drawings.

BRIEF DESCRIPTION OF THE DRAWINGS

FIG. 7 is a flowchart of a pre-read operation in a case in which a pressure plate job is started.

FIG. 9A and FIG. 9B are views showing examples of dimension ranges set in a clear set setting screen.

FIG. 12A and FIG. 12B are views showing operation instruction screens in a clear set mode.

DESCRIPTION OF THE EMBODIMENTS

A configuration example of an image reading apparatus 1005 and an image forming apparatus provided with the image reading apparatus 1005 in an embodiment of the present disclosure will be described below with reference to the drawings.

(Image Forming Apparatus)

Figure 1:
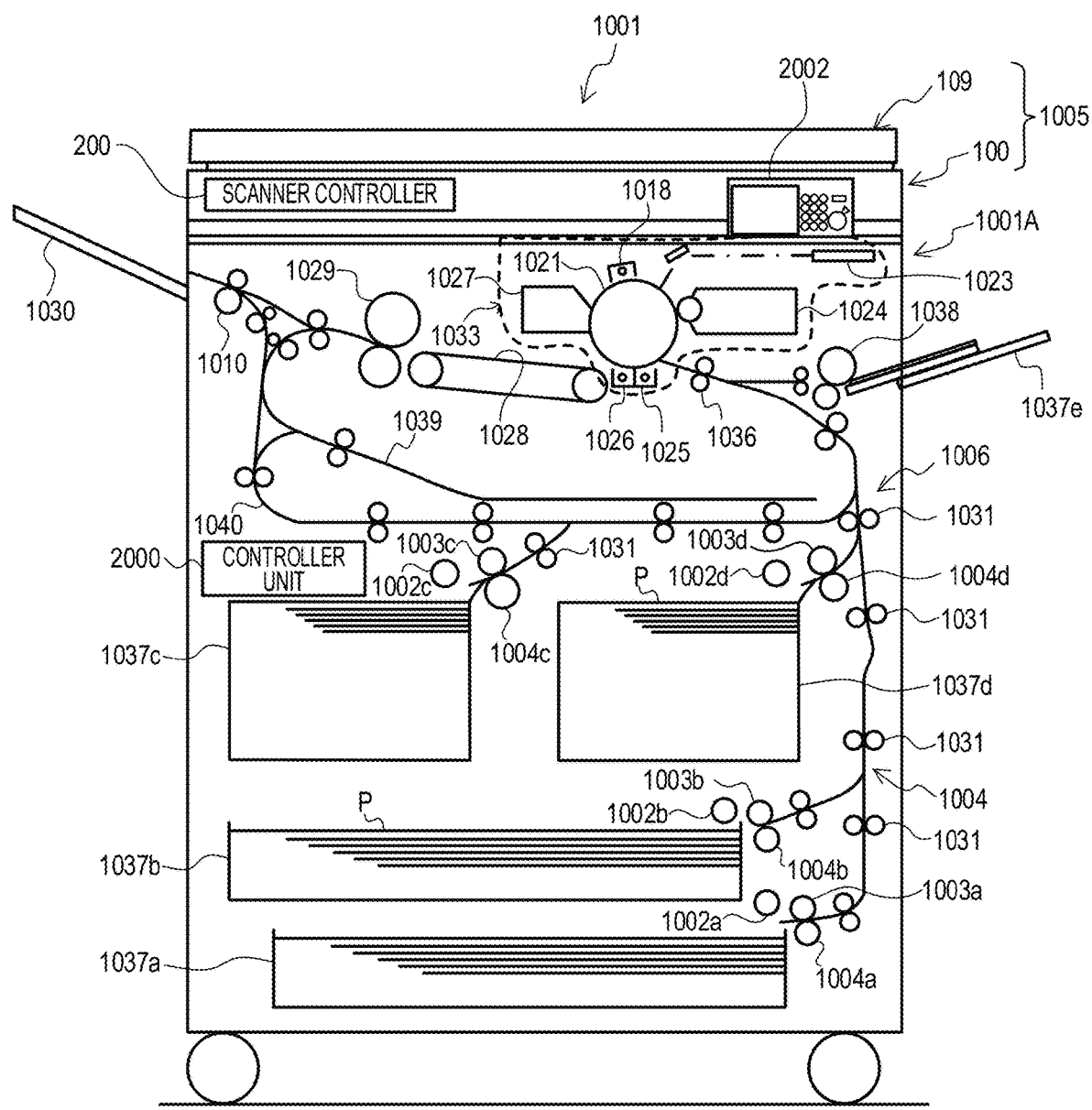
FIG. 1 is a cross-section view of a printer.

First, a printer 1001 as the image forming apparatus provided with the image reading apparatus 1005 will be described with reference to FIG. 1. FIG. 1 is a cross-sectional view of the printer 1001. The printer 1001 comprises a printer body 1001A, an operation display unit 2002 (display) configured to display information and the image reading apparatus 1005. In the following description, a front face side on which a user faces the operation display unit 2002 through which the user performs various inputs/settings to the printer 1001 is referred to as a "front side" of the printer 1001, and a back face side opposite to the front face side is referred to as a "back side" of the printer 1001. That is, FIG. 1 is the cross-sectional view of the printer 1001 as viewed from the front side.

The image reading apparatus 1005 is disposed on an upper portion of the printer body 1001A. The image reading apparatus 1005 comprises a scanner portion 100 and a pressure plate 109. The pressure plate 109 may be provided in an automatic document feeder (not shown) configured to convey documents. The image reading apparatus 1005 optically scans a document to read image data. The image data converted into electrical signals by the image reading apparatus 1005 is transferred to a controller unit 2000 provided in the printer body 1001A via a scanner controller 200. The printer 1001 forms an image on a sheet P, which is a recording medium, based on the image data from the controller unit 2000.

The printer body 1001A has an image forming portion 1033 configured to form an image on the sheet P and a sheet feeding portion 1006 configured to feed the sheet P to the image forming portion 1033. The sheet feeding portion 1006 is provided with a plurality of sheet storage portions 1037a, 1037b, 1037c, and 1037d that can store sheets of different sizes. The sheets stored in the plurality of sheet storage portions 1037a, 1037b, 1037c, and 1037d are sent out by pickup rollers 1002a, 1002b, 1002c, and 1002d, respectively. The sheets P are separated one by one by feed rollers 1003a, 1003b, 1003c, or 1003d and corresponding retard rollers 1004a, 1004b, 1004c, or 1004d and conveyed to a pair of conveyance rollers 1031. The sheet P is conveyed by a pair of conveyance rollers 1031 to a pair of registration rollers 1036.

A manual feed tray 1037e is disposed on a side portion of the printer body 1001A. A sheet P placed on the manual feed tray 1037e by the user is fed to an inside of the printer body 1001A by a feed roller 1038 and conveyed to the pair of registration rollers 1036. A leading edge of the sheet P abuts against a nip of the pair of registration rollers 1036, which is stopped, so that a skew feed of the sheet P is corrected. The pair of registration rollers 1036 starts to rotate according to a formation timing of the toner image by the image forming portion 1033, and conveys the sheet P to the image forming portion 1033.

The image forming portion 1033 forms the toner image on the sheet P by using an electrophotographic method. The image forming portion 1033 is provided with a photosensitive drum 1021, which is a photosensitive member. The photosensitive drum 1021 is rotatable along a conveyance direction of the sheet P. A charger 1018, an exposure device 1023, a developing device 1024, a transfer charger 1025, a separation charger 1026, and a cleaner 1027 are disposed around the photosensitive drum 1021. The charger 1018 uniformly charges a surface of the photosensitive drum 1021, which is rotating. The exposure device 1023 exposes the photosensitive drum 1021 based on image data input from the image reading apparatus 1005 or an external device (for example, a personal computer) and forms an electrostatic latent image on the photosensitive drum 1021.

The developing device 1024 contains a two-component developer comprising toner and carrier, and develops the electrostatic latent image on the photosensitive drum 1021 into a toner image by supplying charged toner to the photosensitive drum 1021. The toner image formed on the photosensitive drum 1021 is transferred onto the sheet P conveyed from the pair of registration rollers 1036 by a bias electric field formed by the transfer charger 1025. The sheet P on which the toner image has been transferred is separated from the photosensitive drum 1021 by a bias electric field formed by the separation charger 1026, and conveyed toward a fixing portion 1029 by a pre-fixing conveyance portion 1028. The toner remaining on the photosensitive drum 1021 without being transferred to the sheet P is removed by the cleaner 1027.

The sheet P conveyed to the fixing portion 1029 is nipped by a pair of rollers and heated while being pressurized, so that the toner fuses and adheres to the sheet P, and the image is fixed to the sheet P. In the case of single-sided printing, the sheet P on which the image is formed is discharged by a pair of discharge rollers 1010 onto a discharge tray 1030 projecting outward from the printer body 1001A. In the case of double-sided printing, the sheet P on which the image is formed on a front surface (first side) is reversed by a reverse portion 1039 so that the front surface and a back surface of the sheet P is reversed, and the sheet P is conveyed to the pair of registration rollers 1036 by a double-sided conveyance portion 1040. The image forming portion 1033 forms a toner image on the back surface (second side) opposite to the front surface (first side) of the sheet P. The sheet P, on which a toner image is formed on the back surface, is heated and pressurized by the fixing portion 1029 to form an image on the back surface of the sheet P. The sheet P with the images formed on the both sides is discharged onto the discharge tray 1030 by the pair of discharge rollers 1010.

The image forming portion 1033 of the embodiment forms the image on the sheet P by using the electrophotographic method, while the image forming portion 1033 is an example of an image forming unit. The image forming portion 1033 may form an image on a sheet P by using other method such as an inkjet method or an offset printing method.

(Image Reading Apparatus)

Figure 2A:
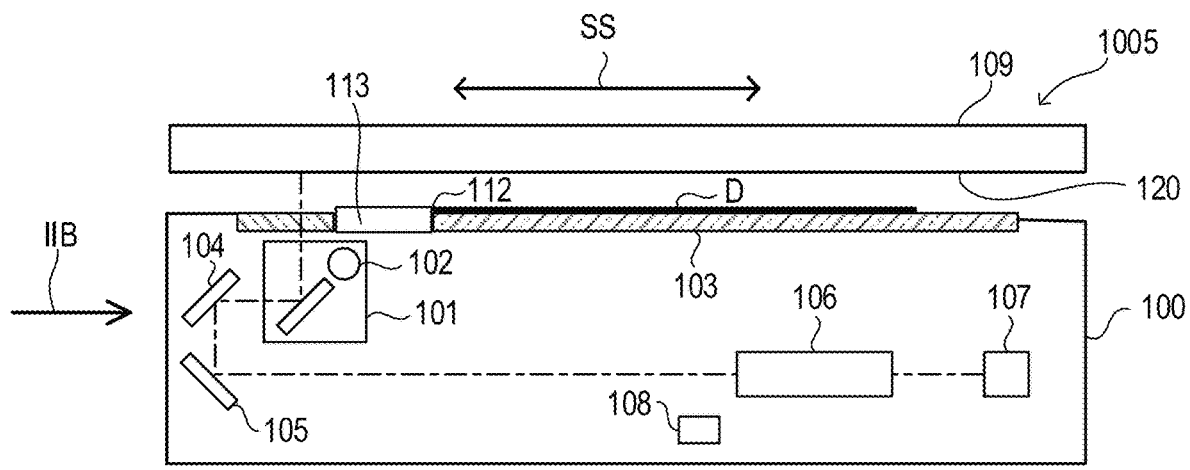
FIG. 2A and FIG. 2B are cross-sectional views of an image reading apparatus.
Figure 2B:
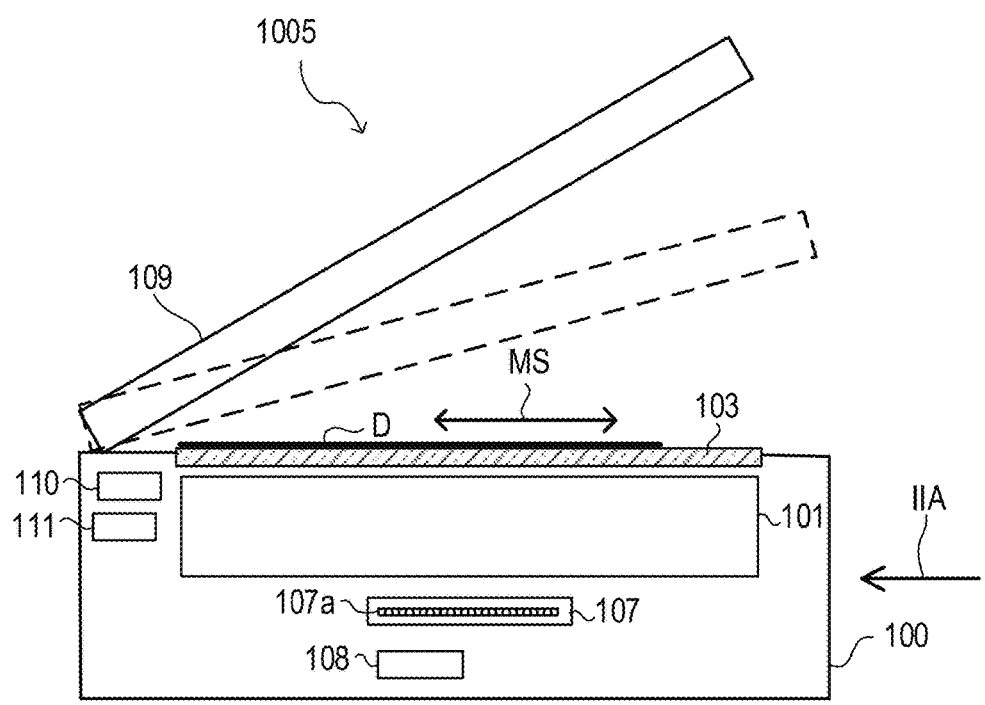

The image reading apparatus 1005 will be described below with reference to FIG. 2A and FIG. 2B. FIG. 2A and FIG. 2B are cross-sectional views of the image reading apparatus 1005. FIG. 2A is a cross-sectional view of the image reading apparatus 1005 as viewing the image reading apparatus 1005 from the front side along a direction indicated by the arrow IIA in FIG. 2B. FIG. 2B is a cross-sectional view of the image reading apparatus 1005 as viewed from the left side of the image reading apparatus 1005 along a direction indicated by the arrow IIB in FIG. 2A. The scanner portion 100 has a scanner unit 101 (reader) including a lamp (light source) 102, a platen glass 103, a reflecting mirror 104, a reflecting mirror 105, a lens 106, a line sensor 107 configured to convert an amount of received light into an electrical signal, a reflective photosensor 108, and the pressure plate 109. The reflective photosensor 108 as a document size detector detects a document D placed on the platen glass 103 as a transparent document platen. The pressure plate 109 as a platen cover is rotatably provided on an upper portion of the scanner portion 100 so as to open and close the platen glass 103. The pressure plate 109 presses the document placed on the platen glass 103 when closed against the scanner portion 100.

A lamp 102 as an illuminating unit illuminates the document D placed on the platen glass 103. The line sensor 107 is a line image sensor in which a plurality of light receiving portions 107a is disposed side by side in a main scanning direction MS. The line sensor 107 as an image reading unit receives reflected light from the document D illuminated by the lamp 102, reads an image of the document D in the main scanning direction MS, and generates an electrical signal as image data. In addition, the line sensor 107 reads the image of the document D in a sub-scanning direction SS orthogonal to the main scanning direction MS in conjunction with a movement of the scanner unit 101 to the sub-scanning direction SS, and generates an electrical signal as image data.

The image reading apparatus 1005 may be provided with an automatic document feeder (not shown) on the pressure plate 109. The automatic document feeder includes a document tray (not shown) on which documents are placed and is configured to feed documents from the document tray to the platen glass 103.

The scanner portion 100 is provided with a white reference plate 113 disposed on a left end side of the platen glass 103. A white reference portion for reading calibration of the scanner unit 101 is provided on a back side of the white reference plate 113. A document size index is provided on a front side of the white reference plate 113. A right end of the white reference plate 113 constitutes a document abutment portion 112 against which the document D abuts in the sub-scanning direction SS when the document D is placed on the platen glass 103. The document abutment portion 112 serves as a document positioning portion for positioning an edge of a document in the sub-scanning direction SS of the document D.

In FIG. 2B, a first sensor 110 detects an opening angle of 25 degrees of the pressure plate 109 with respect to the platen glass 103. A second sensor 111 detects an opening angle of 5 degrees of the pressure plate 109 with respect to the platen glass 103.

(Scanner Controller)

Figure 3:
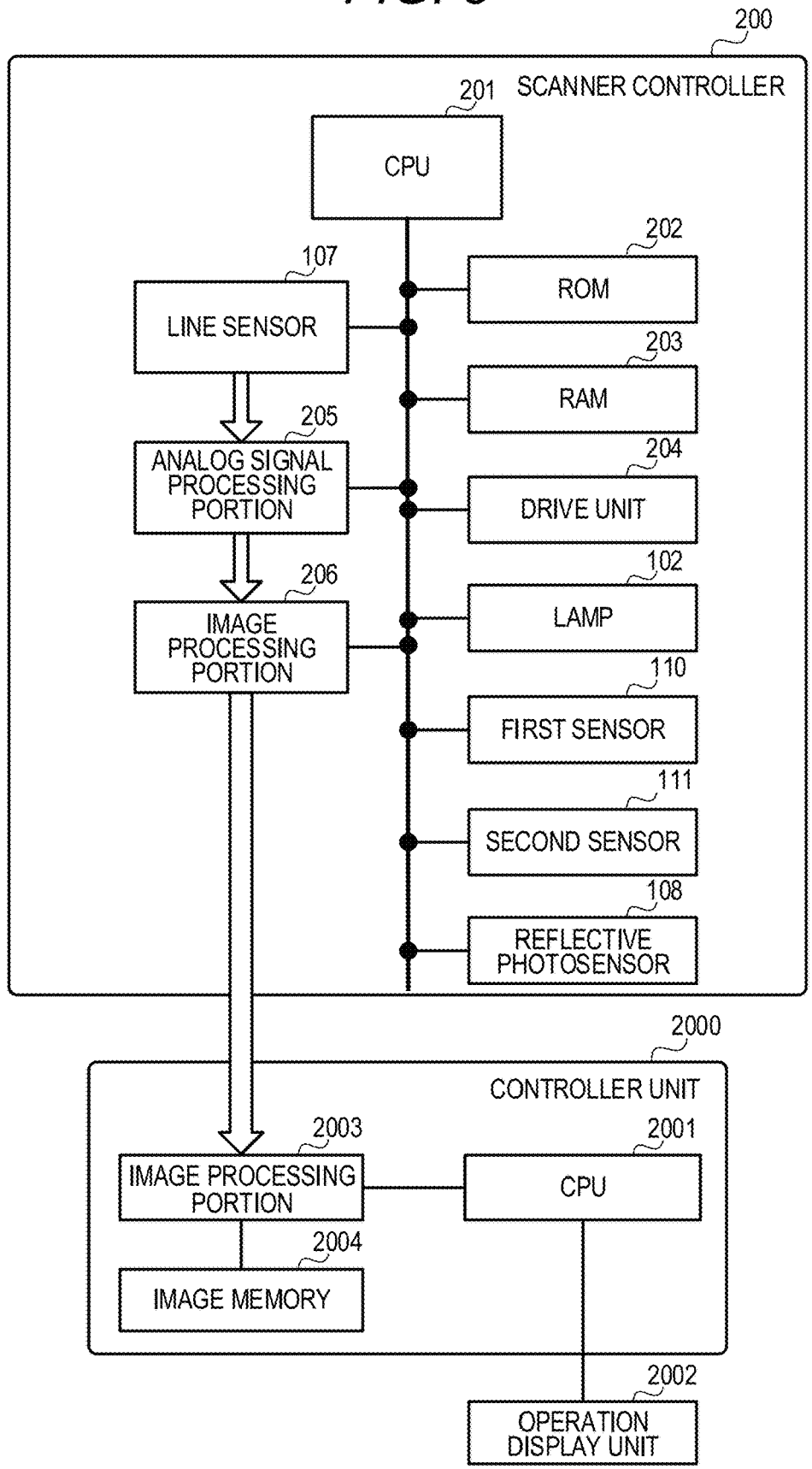
FIG. 3 is a block diagram of a scanner controller and a controller unit.

The scanner controller 200 (controller) configured to control the image reading apparatus 1005 will be described below. FIG. 3 is a block diagram of the scanner controller 200 and the controller unit 2000. The scanner portion 100 is controlled by the scanner controller 200 so as to move the scanner unit 101 in the sub-scanning direction SS to read the document D placed on the platen glass 103 to output image data. The scanner controller 200 has a Central Processing Unit (CPU) 201, a Read Only Memory (ROM) 202, a Random Access Memory (RAM) 203, a drive unit 204, an analog signal processing portion 205 and an image processing portion 206. The CPU 201 is electrically connected to the ROM 202, the RAM 203, the line sensor 107, the analog signal processing portion 205, and the image processing portion 206. The CPU 201 is electrically connected to the drive unit 204, the lamp 102, the first sensor 110, the second sensor 111, and the reflective photosensor 108.

The CPU 201 performs a reading control based on a program stored in the ROM 202. The RAM 203 is used as a work area for the CPU 201. The drive unit 204 is controlled by the CPU 201 to move the scanner unit 101 to a desired position. When an image is to be read, the scanner unit 101 is first moved to a position of the white reference plate 113 by the drive unit 204, the lamp 102 is turned on, and the white reference plate 113 is read by the scanner unit 101, and the known shading correction processing is performed. After performing the shading correction, the scanner unit 101 is moved in the sub-scanning direction SS with the lamp 102 turned on, and the image of the document D is read by the line sensor 107 with the document abutment portion 112 as the document leading edge in the sub-scanning direction SS. The read analog image signal is converted into a digital image signal by the analog signal processing portion 205. The digital image signal is output to the controller unit 2000 through the image processing portion 206.

(Controller Unit)

The controller unit 2000 has a CPU 2001, an image processing portion 2003 and an image memory 2004. The CPU 2001 is electrically connected to the image processing portion 2003 and the operation display unit 2002. The digital image signal input to the controller unit 2000 is subjected to image processing by the image processing portion 2003 and stored in the image memory 2004 as image data.

(Multi-Crop Mode)

Figure 4A:
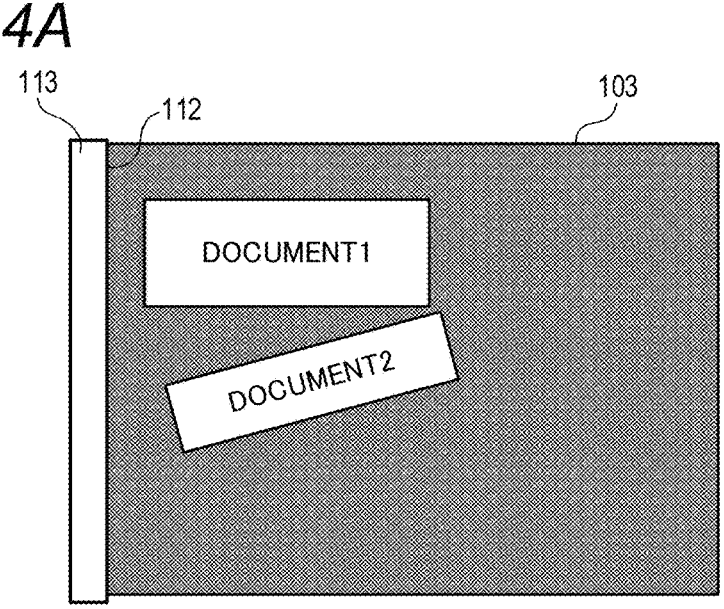
FIG. 4A, FIG. 4B, and FIG. 4C are views showing a plurality of documents placed on a platen glass in a multi-crop mode.
Figure 4B:
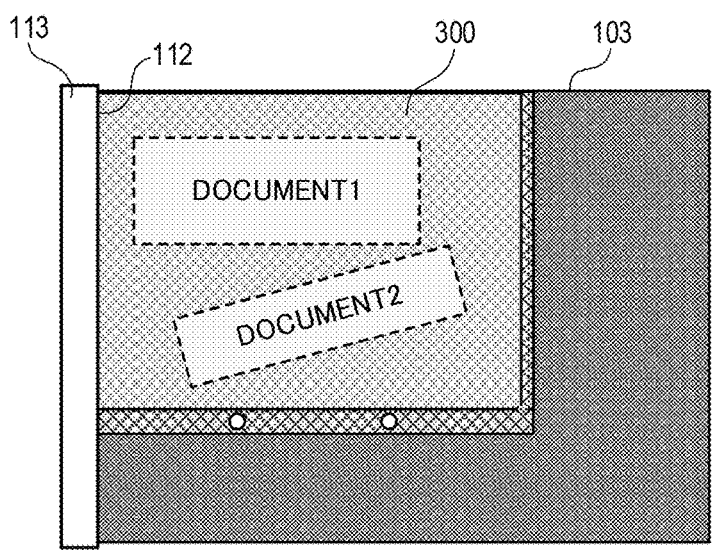
Figure 4C:
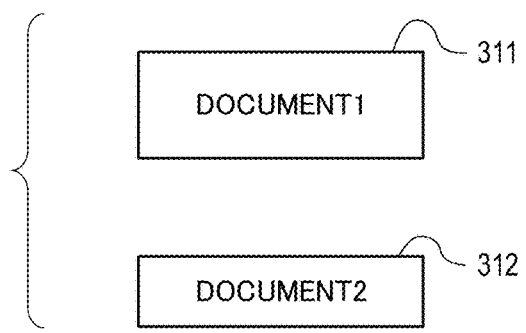

The image reading apparatus 1005 has a multi-crop function and is operable in a multi-crop mode. With reference to FIG. 4A, FIG. 4B, and FIG. 4C, an operation in the so-called "multi-crop mode" in which a plurality of documents is placed on the platen glass 103 of the image reading apparatus 1005 and the pressure plate 109 is closed to read images of one or more documents will be described. FIG. 4A, FIG. 4B, and FIG. 4C are views showing the plurality of documents placed on the platen glass 103 in the multi-crop mode. FIG. 4A is a view showing Document 1 and Document 2 placed directly on the platen glass 103. In the embodiment, a mode for reading a plurality of documents placed directly on the platen glass 103 as shown in FIG. 4A is referred to as a "direct placement mode."

FIG. 4B is a view showing Document 1 and Document 2 tucked in a clear set (clear holder) 300 on the platen glass 103. In the embodiment, an example shown in FIG. 4B is referred to as a "clear set mode." The image reading apparatus 1005 is operable selectively between in the direct placement mode and in the clear set mode. The clear set 300 is a storage member (clear member) that has a transparent portion, has a dimension larger than a predetermined standard size, and can store a sheet of the predetermined standard size. The clear set 300, in which one or more documents are tucked, is placed on the platen glass 103 so that at least the transparent portion comes into contact with the platen glass 103. The clear set 300 is, for example, a clear holder, a clear file, or a clear pocket.

Both the "direct placement mode" and the "clear set mode" can be performed by instructions from the operation display unit 2002, and one or more documents placed on the platen glass 103 can be read in one scan in the same manner as a normal pressure plate scan. Respective areas of the documents are individually extracted from the read image data by image processing, and the read image data are output as separate image data 311 and 312 for each document as shown in FIG. 4C. Each of a reading range (scanning range) and a document extraction range in the "direct placement mode" is an entire surface of the platen glass 103 (an entire image readable area). Each of a reading range and a document extraction range in the "clear set mode" is an area corresponding to the dimension (size) of the clear set 300. As shown in FIG. 4C, the image data 311 of "Document 1" and the image data 312 of "Document 2" are output as deliverables separately in both the "direct placement mode" and "clear set mode". The "direct placement mode" is effective for reading a plurality of thick documents such as business cards and licenses easily at once. The "clear set mode" is effective for reading a plurality of thin and curled documents such as cash register paper at once as suppressing the raising and moving of the documents.

Figure 5A:
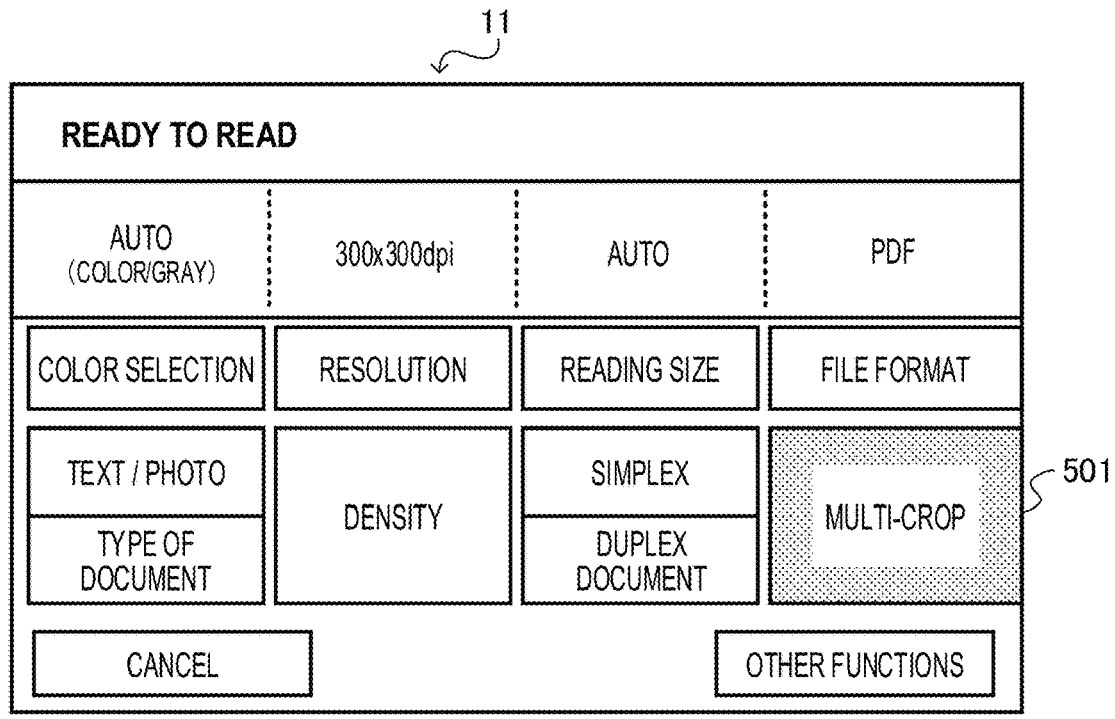
FIG. 5A, FIG. 5B, FIG. 5C, and FIG. 5D are views showing a series of operation screens for setting the multi-crop mode.

FIG. 5A, FIG. 5B, FIG. 5C, and FIG. 5D are views showing a series of operation screens for setting the multi-crop mode. With reference to FIG. 5A, FIG. 5B, FIG. 5C, and FIG. 5D, a flow of the series of operation screens displayed when designating the "multi-crop mode" from the operation display unit 2002 with respect to the image reading apparatus 1005 will be described. FIG. 5A is a view showing a standby screen 11 displayed on the operation display unit 2002. The standby screen 11 includes a multi-crop button 501. When the user presses the multi-crop button 501 displayed on the standby screen 11, the standby screen 11 is transferred to a multi-crop setting screen 12 shown in FIG. 5B. The multi-crop setting screen 12 displays alternatives of document placement methods selectable in a multi-crop operation. The multi-crop setting screen 12 includes a direct placement mode selection button 502 and a clear set mode selection button 503. The user can select either one of the "direct placement mode" or the "clear set mode." When the user presses the direct placement mode selection button 502, the "direct placement mode" is selected. When the user presses the clear set mode selection button 503, the "clear set mode" is selected.

Figure 5B:
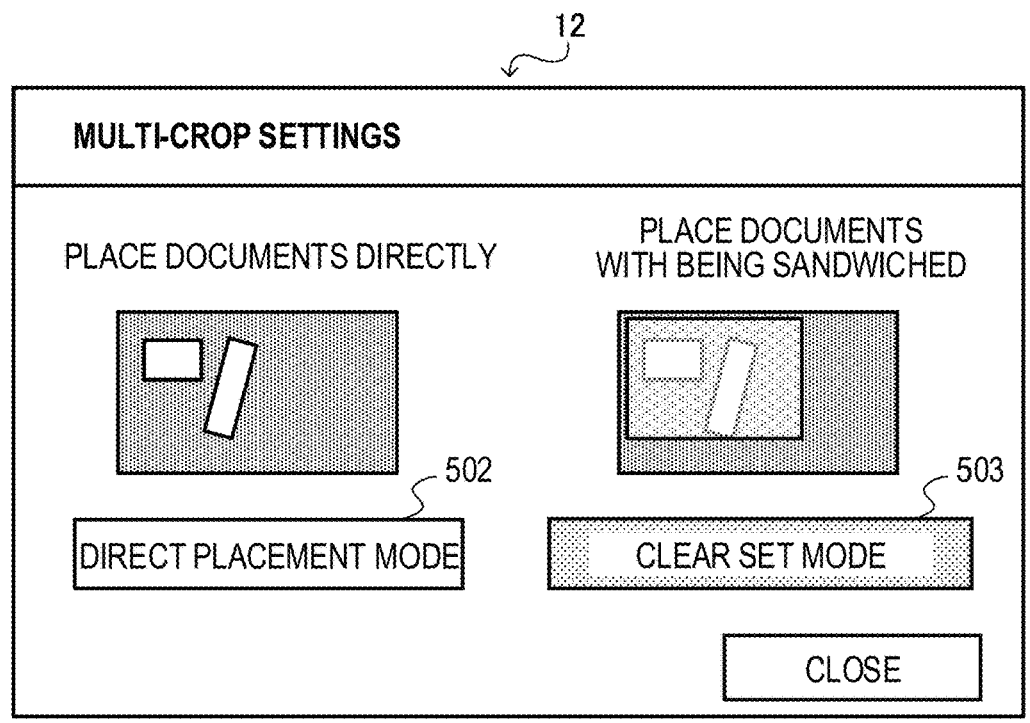
Figure 5C:
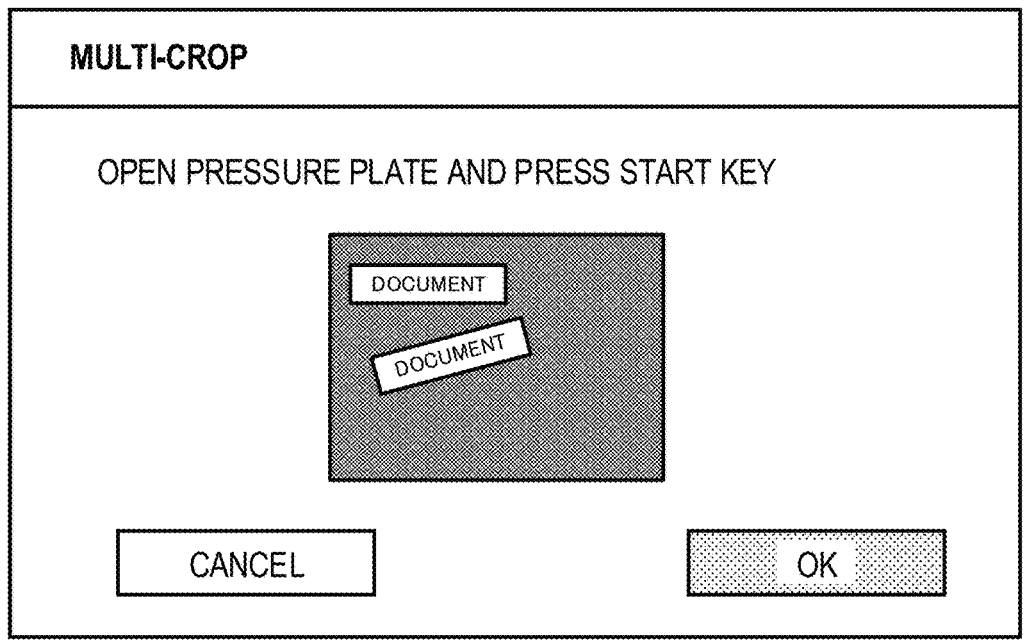

In a case in which the "direct placement mode" is selected in the multi-crop setting screen 12 shown in FIG. 5B, the CPU 2001 transfers the multi-crop setting screen 12 to an operation instruction screen 13 shown in FIG. 5C. The operation instruction screen 13 shown in FIG. 5C instructs a document setting method in the "direct placement mode" to the user. The document extraction range in the "direct placement mode" is the entire surface of the platen glass 103. When a reading operation is performed by closing the pressure plate 109 on the plurality of documents placed directly on the platen glass 103, a back side of the pressure plate 109 may contact closely to edges of the documents, making it difficult to read the edges of the documents. Therefore, in the "direct placement mode," the operation instruction screen 13 instructs the user to start scanning with the pressure plate 109 open as shown in FIG. 5C.

Figure 5D:
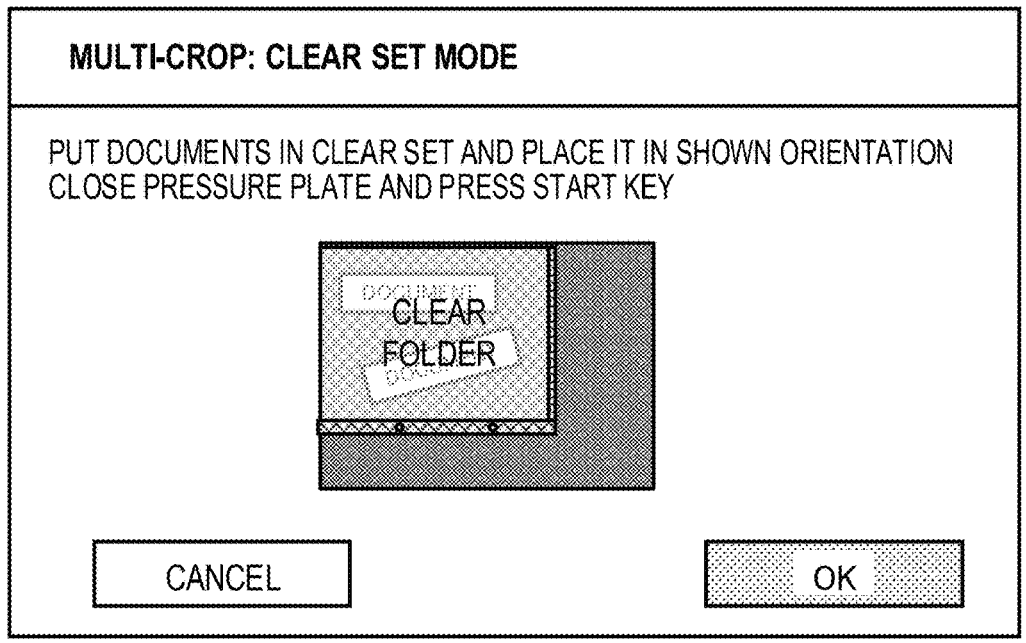

In a case in which the "clear set mode" is selected in the multi-crop setting screen 12 shown in FIG. 5B, the CPU 2001 transfers the multi-crop setting screen 12 to an operation instruction screen 14 shown in FIG. 5D. The operation instruction screen 14 shown in FIG. 5D instructs a document setting method in the "clear set mode" to the user. The document extraction range in the "clear set mode" is the area corresponding to the dimension of the clear set 300 (clear holder). Since the clear set 300 is thick, a distance is ensured between the back side of the pressure plate 109 and the documents tucked in the clear set 300 by the thickness of the clear set 300 when the pressure plate 109 is closed. Since there is the distance between the back side of the pressure plate 109 and the documents, shadows of the edges of the documents occur on the back side of the pressure plate 109. Therefore, the edges of the documents in the clear set 300 are easier to detect compared to the edges of the documents placed directly on the platen glass 103. Also, when the scanning operation is performed with the pressure plate 109 open, the light from the light source is dazzling to the user. Therefore, in the "clear set mode," the operation instruction screen 14 instructs the user to start scanning with the pressure plate 109 closed as shown in FIG. 5D.

In the "clear set mode," the document extraction range is limited to the area corresponding to the dimension of the clear set 300. Therefore, depending on the orientation of the clear set 300 placed on the platen glass 103, a part of a document tucked in the clear set 300 may be out of the document extraction range. In that case, the edges of the document cannot be detected so that the document cannot be read accurately. Therefore, in the "clear set mode," the operation instruction screen 14 instructs the orientation in which the clear set 300 is to be placed on the platen glass 103 as shown in FIG. 5D to the user. Hereafter, with reference to FIG. 6A and FIG. 6B, each of examples will be described in which a part of a document tucked in the clear set 300 is out of the document extraction range due to the orientation of the clear set 300 placed on the platen glass 103.

Figure 6A:
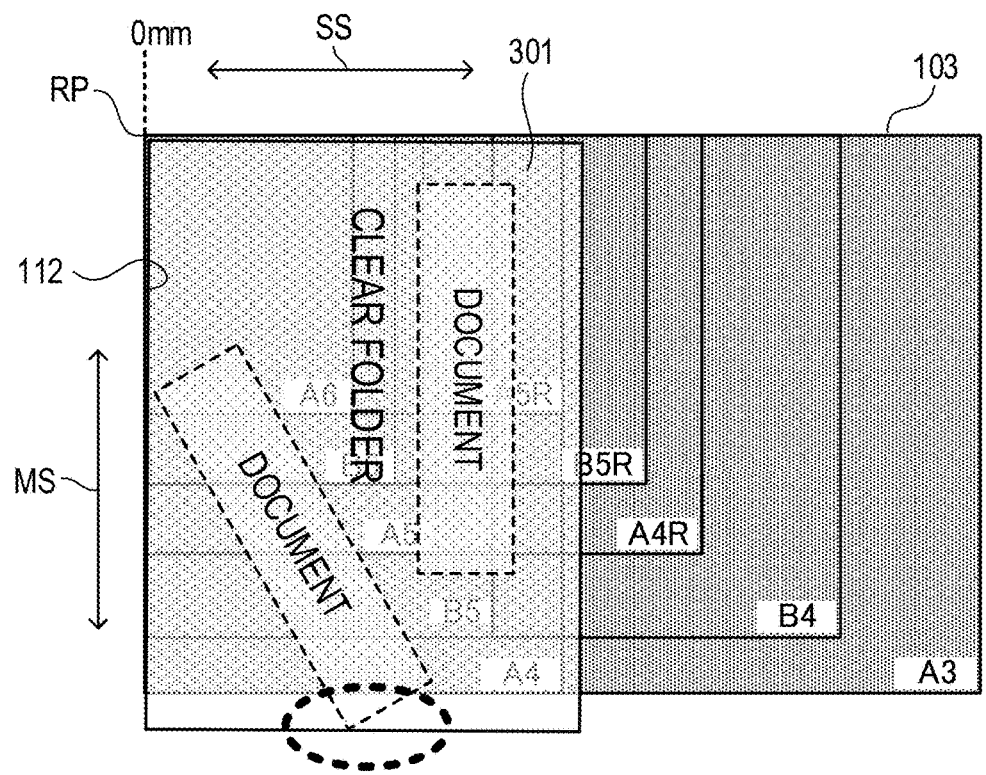
FIG. 6A and FIG. 6B are views showing examples in which respective portions of clear sets extend beyond the corresponding document extraction ranges.
Figure 6B:
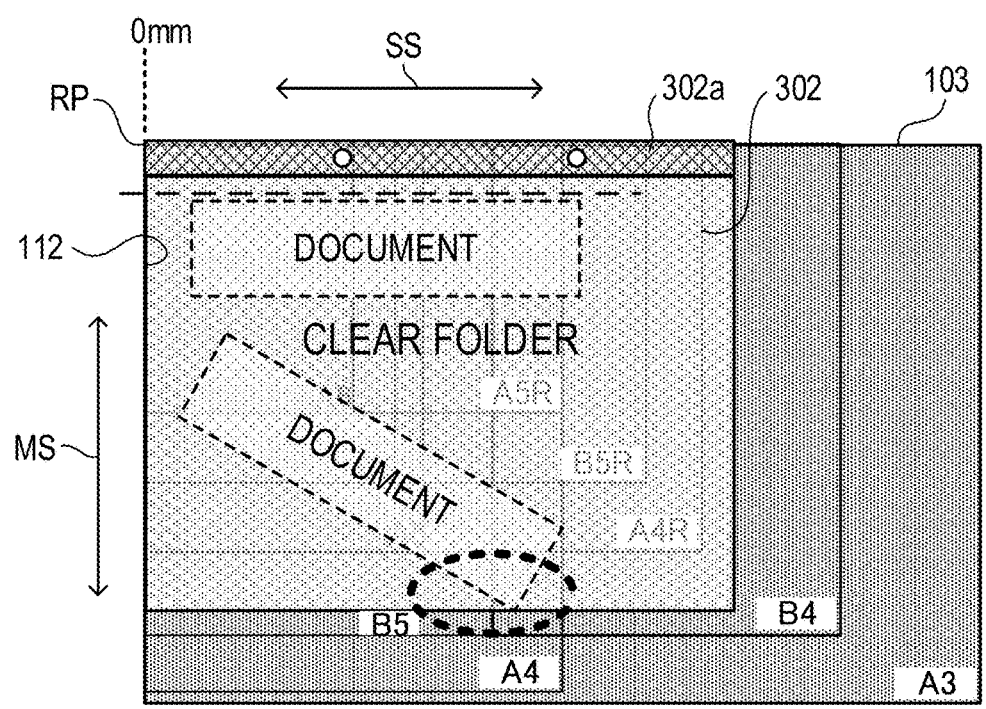

FIG. 6A and FIG. 6B are views showing the examples in which respective portions of clear sets 301 and 302 extend beyond the corresponding document extraction ranges. The user places the clear set 300 on the platen glass 103 with the corners of the clear sets 301 and 302 roughly aligned with a document abutting position RP, which is an end point of the document abutment portion 112 on the back side. As shown in FIG. 6A and FIG. 6B, depending on the orientations in which the clear sets 301 and 302 are placed on the platen glass 103, the edges of the documents tucked in the insides of the clear sets 301 and 302 may protrude from the document extraction ranges so that the ranges of the documents may not be extracted correctly. In FIG. 6A, an end of the clear set 301 in the longitudinal direction extends beyond the document extraction range. Therefore, a part of a document in the clear set 301 is out of the document extraction range. In FIG. 6B, the clear set 302 has a binding hole portion 302a. The binding hole portion (document unsettable portion) 302a of the clear set 302 is placed on the side of the document abutting position RP (reference position). The document abutting position RP is a reference position for an image reading operation. Although a method of setting a dimension range as the document extraction range of the clear set will be described later, an end of the clear set 302 in a short direction extends beyond the set document extraction range. Therefore, a part of the document in the clear set 302 is out of the document extraction range.

In the cases in which the parts of the clear sets 301 and 302 are out of the document extraction ranges, the CPU 2001 displays the following instructions on the operation instruction screen 14 as shown in FIG. 5D. (i) In the case in which a dimension of the clear set 301 in the longitudinal direction is larger than a dimension of a readable range of the image reading apparatus 1005 in the short direction as shown in FIG. 6A, the CPU 2001 displays an indication on the operation instruction screen 14 for instructing the user to place the clear set 301 sideways. (ii) The CPU 2001 displays an indication on the operation instruction screen 14 for instructing the user to place the clear set 302 so that the binding hole portion (document unsettable portion) 302a of the clear set 302 is in a predetermined placement. In the embodiment shown in FIG. 5D, the CPU 2001 displays the indication for instructing the user to place the clear set 302 so that the binding hole portion 302a is located on a lower edge of an opposite side far from the document abutting position RP.

A method of determining the reading range in the "clear set mode" will be described later. In a case in which the user selects, for example, the "direct placement mode" on the multi-crop setting screen 12, places documents on the platen glass 103 according to the operation instruction screen 13, and presses a start key, the CPU 2001 stores the selected settings and executes the reading operation. On the other hand, in a case in which the user selects the "clear set mode," places a clear set on the platen glass 103 according to the operation instruction screen 14, closes the pressure plate 109, and presses the start key, the CPU 2001 stores the selected settings and executes the reading operation.

(Pre-Read Operation)

Hereafter, with reference to FIG. 7, an operation performed before the image reading operation is started in the case in which a pressure plate job which is a pressure plate reading operation is started will be described. FIG. 7 is a flowchart of a pre-read operation in a case in which the pressure plate job is started. When the pressure plate job is started by the user, the CPU 2001 checks the settings selected and stored by the operation of the operation display unit 2002 and determines whether or not the "multi-crop mode" is set (S601). In a case in which the "multi-crop mode" is not set (NO in S601), the CPU 2001 reads a document placed on the platen glass 103 in a normal pressure plate job mode. In the normal pressure plate job mode, before a start of image reading, a size of the document placed on the platen glass 103 is detected or the size of the document is designated, so that the standard size of the document to be read is determined at the start of image reading. Therefore, the CPU 2001 sets the determined standard size as the reading range (S604) and starts the reading operation (S607).

On the other hand, in a case in which the "multi-crop mode" is set (YES in S601), the CPU 2001 once invalidates the reading range as the standard size determined before the start of image reading by the procedure in the normal pressure plate (S602). This is to prevent, in a case in which the "clear set mode" is set, the reading range from being determined as the standard size slightly smaller than a dimension of a clear set to be used, so as to ensure that no part of the document extending out beyond the determined reading range cannot be read. In addition, this is to prevent, in a case in which the "direct placement mode" is set, the reading range as the standard size determined based on a local detection result from being different from a range in which the document is actually placed, so as to ensure that no part of the document extending out beyond the determined standard size cannot be read.

The CPU 2001 determines whether the "multi-crop mode" is set to the "clear set mode" (S603). In the case in which the "direct placement mode" is set instead of the "clear set mode" (NO in S603), the document may be placed anywhere on the platen glass 103. Therefore, the CPU 2001 sets the entire surface of the platen glass 103 as the reading range (S605) and starts the reading operation (S607). On the other hand, in the case in which the "clear set mode" is set (YES in S603), it is assumed that the document is tucked in the clear set without extending out beyond the dimension range of the clear set to be used. Therefore, the CPU 2001 sets the dimension range of the clear set to be used as the reading range (S606) and starts the reading operation (S607).

Here, a setting of the reading range in the case in which the "clear set mode" is set (YES in S603) will be described. As described above, in the "clear set mode," the dimension range of the clear set is set as the reading range (S606). According to a normal document size detection method in the pressure plate job, the standard size is set as the reading range (S604), and thus the dimension range of the clear set cannot be obtained. Therefore, in the embodiment, the dimension range of the clear set is obtained by the following method.

Figure 8A:
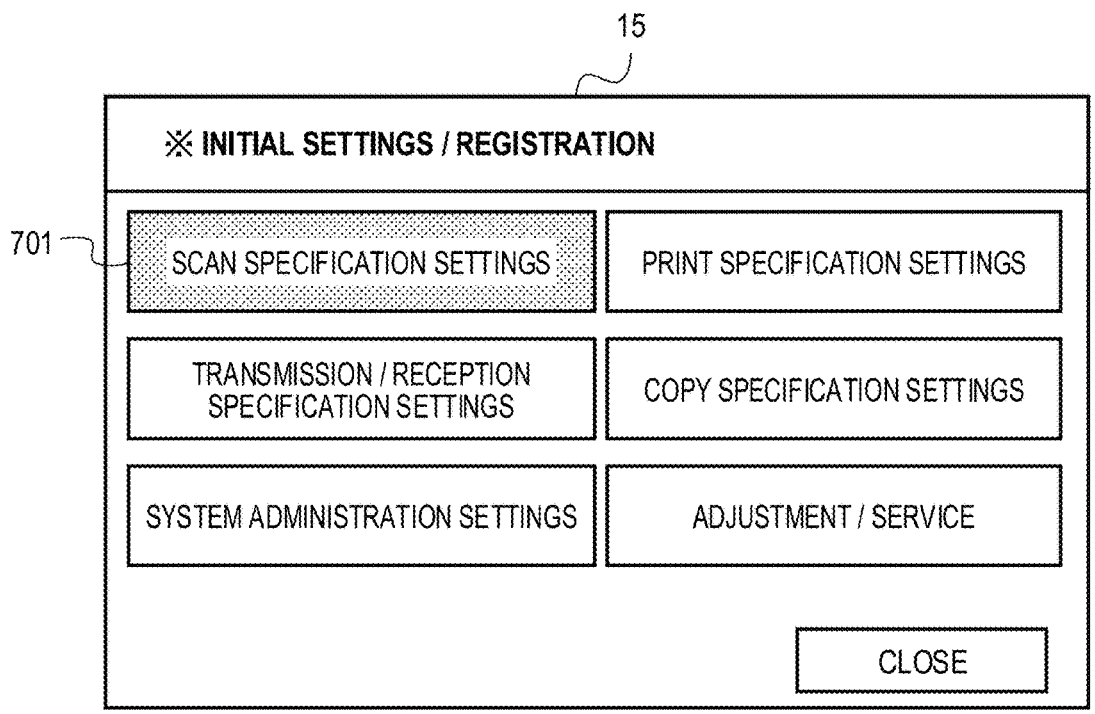
FIG. 8A, FIG. 8B, and FIG. 8C are explanatory views of a setting method of a dimension range of a clear set.
Figure 8B:
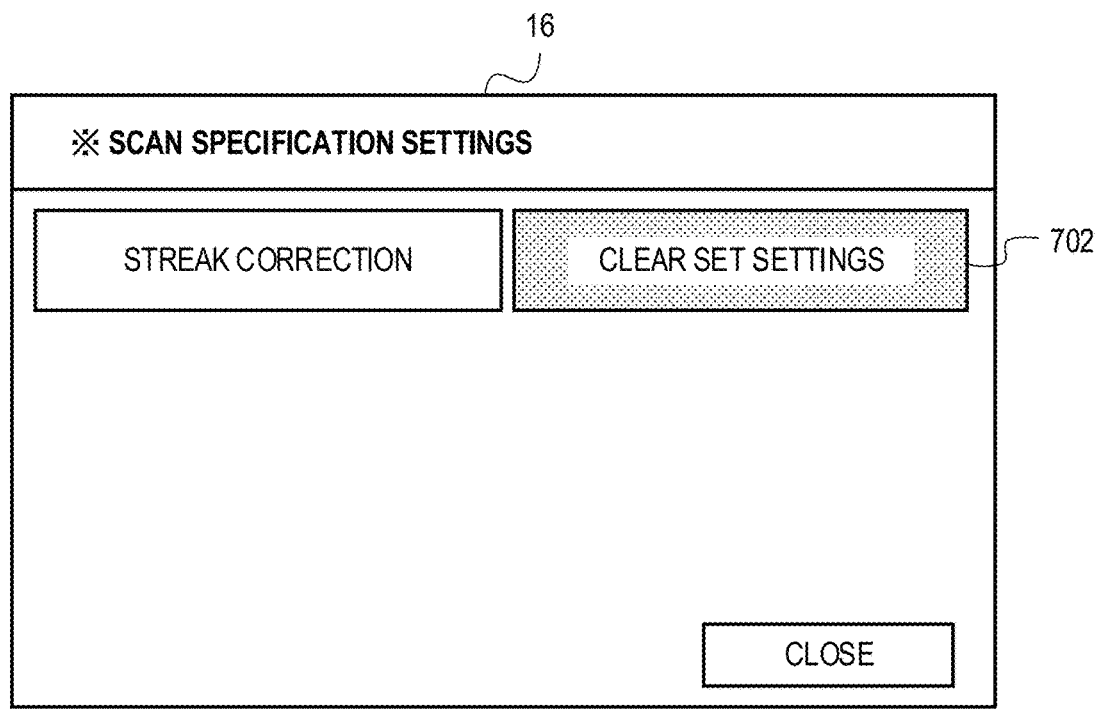
Figure 8C:
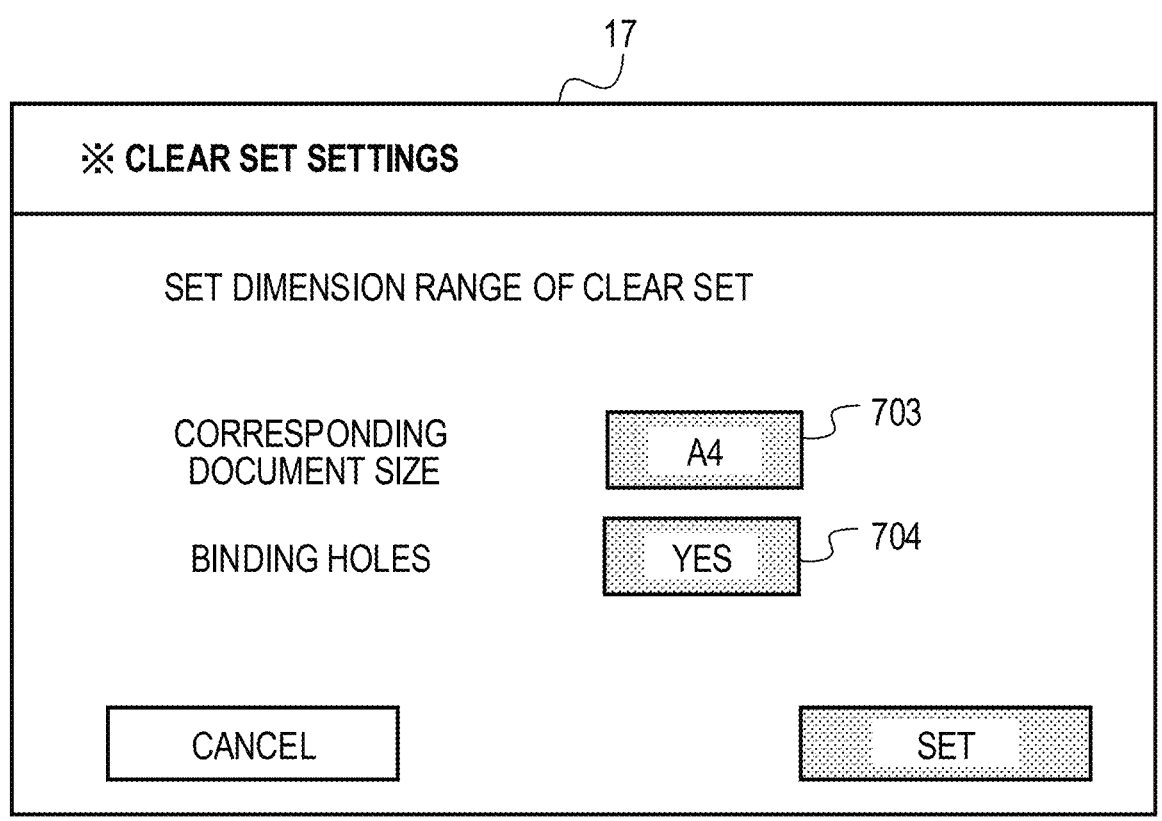

FIG. 8A, FIG. 8B, and FIG. 8C are explanatory views of a setting method of the dimension range of the clear set. FIG. 8A is a view showing a setting selection screen 15 displayed on the operation display unit 2002 to select the setting registration contents of the image reading apparatus 1005. In FIG. 8A, when the user selects a scan specification setting button 701 for performing various settings of the reading operation, the CPU 2001 transfers the setting selection screen 15 to a scan specification setting screen 16 shown in FIG. 8B. FIG. 8B is a view showing the scan specification setting screen 16 displayed on the operation display unit 2002. In FIG. 8B, when the user selects a clear set setting button 702, the CPU 2001 transfers the scan specification setting screen 16 to a clear set setting screen 17 shown in FIG. 8C. FIG. 8C is a view showing the clear set setting screen 17 displayed on the operation display unit 2002. In the clear set setting screen 17, the user can set two items: a corresponding document size and binding holes. The corresponding document size is set by a corresponding document size setting button 703. The binding holes are set by a binding hole setting button 704.

FIG. 9A and FIG. 9B are views showing examples of dimension ranges set in the clear set setting screen 17. The user presses the corresponding document size setting button 703 to set a standard size corresponding to a clear set to be used. FIG. 9A is a view showing corresponding document sizes displayed on the corresponding document size setting button 703 and internal information set when a corresponding document size is selected. For example, in a case in which the corresponding document size "A4" is selected, a length W of 220 mm (W=220) of the short side and a length H of 310 mm (H=310) of the long side are set as the internal information of the reading range. In FIG. 9A, symbols "×" and "○" in the "vertical placement" and "horizontal placement" columns respectively indicate whether the clear set of the corresponding document size extending out beyond the readable range of the image reading apparatus 1005 when the clear set is vertically and horizontally placed. For example, in a case in which the corresponding document size "A4" is selected, the symbol "×" in the vertical placement means that the clear set extends out beyond the readable range, and the symbol "○" in the horizontal placement means that the clear set can be placed within the readable range. The vertical placement means that the clear set is placed on platen glass 103 so that the long side of the clear set extends along the main scanning direction MS (FIG. 6A). The horizontal placement means that the clear set is placed on the platen glass 103 so that the long side of the clear set extends along the sub-scanning direction SS (FIG. 6B).

Figure 10A:
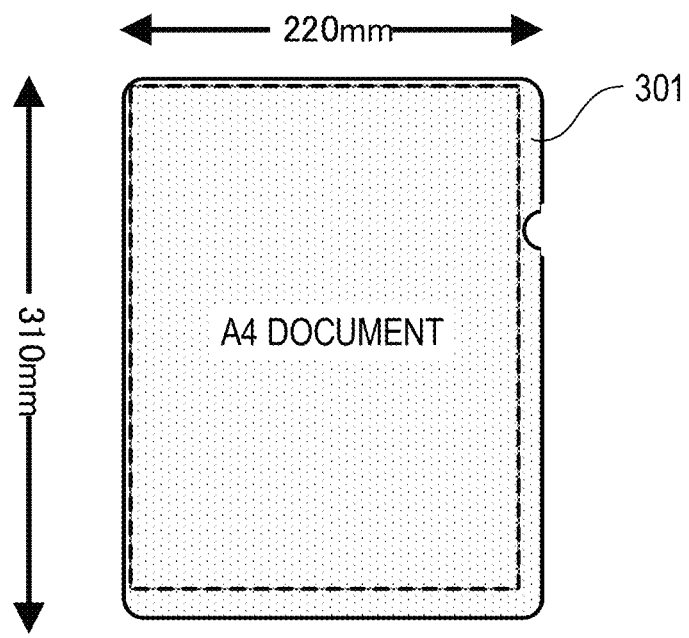
FIG. 10A and FIG. 10B are views showing clear sets, respectively.
Figure 10B:
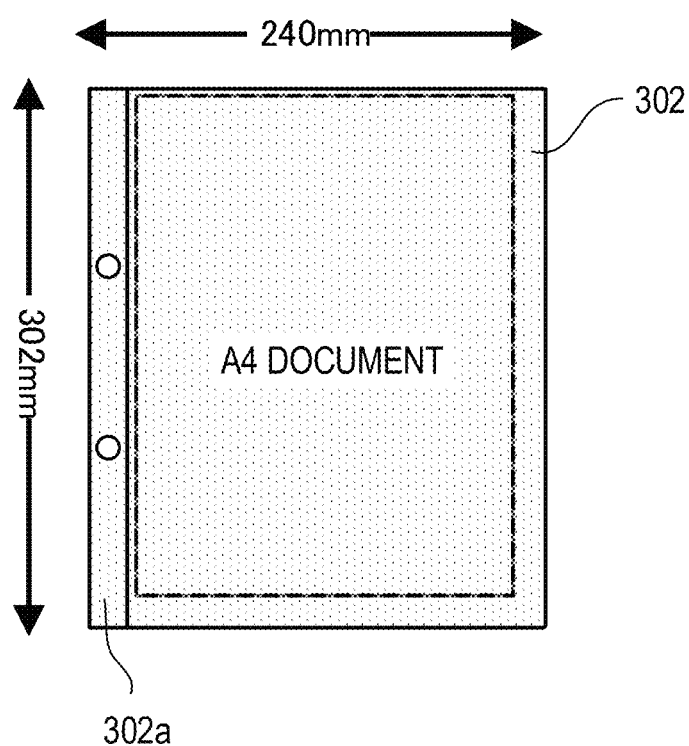

FIG. 9B is a view showing the binding holes "YES" or "NO" displayed on the binding hole setting button 704 and the internal information set when the binding holes "YES" or "NO" is selected. The binding hole setting button 704 classifies the types of clear sets as to the binding holes "YES" and "NO." The binding holes "YES" means that the clear set has binding holes. The binding holes "NO" means that the clear set does not have binding holes. FIG. 10A and FIG. 10B are views showing clear sets, respectively. The clear set 301 shown in FIG. 10A is a clear file without binding holes. The clear set 302 shown in FIG. 10B is a clear pocket with the binding hole portion 302a in which binding holes are provided. Generally, the clear set 302 shown in FIG. 10B has a longer length W of the short side on which with an insertion opening for inserting documents is provided and a shorter length H of the long side, compared to the clear set 301 shown in FIG. 10A. Therefore, in a case in which the binding holes "YES" is selected by the binding hole setting button 704, 10 mm is added to the length W of the short side of the internal information set by the corresponding document size setting button 703, and 5 mm is subtracted from the length H of the long side of the internal information set by the corresponding document size setting button 703.

For example, a dimension range (reading range) of a clear set in the case in which A4 size is selected by the corresponding document size setting button 703 is set as follows according to the selection of the binding holes "YES" or "NO" by the binding hole setting button 704.

(1) In a case in which the binding holes "NO" is selected by the binding hole setting button 704, the length W of the short side of the dimension range of the clear set is set to 220 mm and the length H of the long side is set to 310 mm. When the clear set 301 of the set dimension range is placed on the platen glass 103 so that the long side of the clear set 301 is in the vertical direction as shown in FIG. 6A, a part of the clear set 301 on the front side may extend out beyond the readable range of the image reading apparatus 1005. Therefore, the CPU 2001 displays the operation instruction screen 14 for instructing the orientation of the clear set 301 so that the long side of the clear set 301 is in the horizontal direction as shown in FIG. 5D.

(2) In a case in which the binding holes "YES" is selected by the binding hole setting button 704, the length W of the short side of the dimension range of the clear set is set to 230 mm (220+10) and the length H of the long side is set to 305 mm (310−5). When the clear set 302 of the set dimension range is placed on the platen glass 103 so that the long side of the clear set 302 is in the vertical direction, a part of the clear set 302 on the front side may extend out beyond the readable range of the image reading apparatus 1005 as in the case of (1) above. Therefore, the CPU 2001 displays the operation instruction screen 14 for instructing the orientation of the clear set 302 so that the long side of the clear set 302 is in the horizontal direction as shown in FIG. 5D. Here, a description will be provided of a case in which the clear set 302 of the set dimension range is placed in the horizontal direction and with the binding hole portion 302*a* positioned on the upper side as shown in FIG. 6B. At this time, the dimension range (reading range) in the vertical direction is set to the range in which the length W of the short side is 230 mm with reference to the document abutting position RP. In this case, there is a possibility that the binding hole portion 302*a*, in which any document cannot be tucked, is within the set reading range while the lower end portion of the clear set 302 is out of the set reading range. Therefore, the CPU 2001 displays an instruction on the operation instruction screen 14 urging the user to place the clear set 302 so that the binding hole portion 302*a* is positioned on the far side from the document abutting position RP as shown in FIG. 5D. In the operation instruction screen 14 shown in FIG. 5D, the binding hole portion 302*a* is displayed so as to be on the lower side. On the contrary, an instruction for positioning the binding hole portion 302*a* on the upper side may be displayed on the operation instruction screen 14, and the reading range may be shifted downward by the amount of the binding hole portion 302*a*.

Then, in a case in which the corresponding document size "B5" is selected by the corresponding document size setting button 703, a length W of 193 mm (W=193) of the short side and a length H of 271 mm (H=271) of the long side are set as the internal information of the reading range from FIG. 9A. A dimension range (reading range) of a clear set is set as follows according to the selection of the binding hole "YES" or "NO" by the binding hole setting button 704.

(1) In a case in which the binding holes "NO" is selected by the binding hole setting button 704, the length W of the short side of the dimension range of the clear set is set to 193 mm and the length H of the long side is set to 271 mm. In the case in which the corresponding document size "B5" is selected, the clear set can be placed either in the vertical placement or in the horizontal placement within the reading range because the vertical placement is "○" and the horizontal placement is also "○" from FIG. 9A.

(2) In a case in which the binding holes "YES" is selected by the binding hole setting button 704, the length W of the short side of the dimension range of the clear set is set to 203 mm (193+10) and the length H of the long side is set to 266 mm (271−5).

Figure 11:
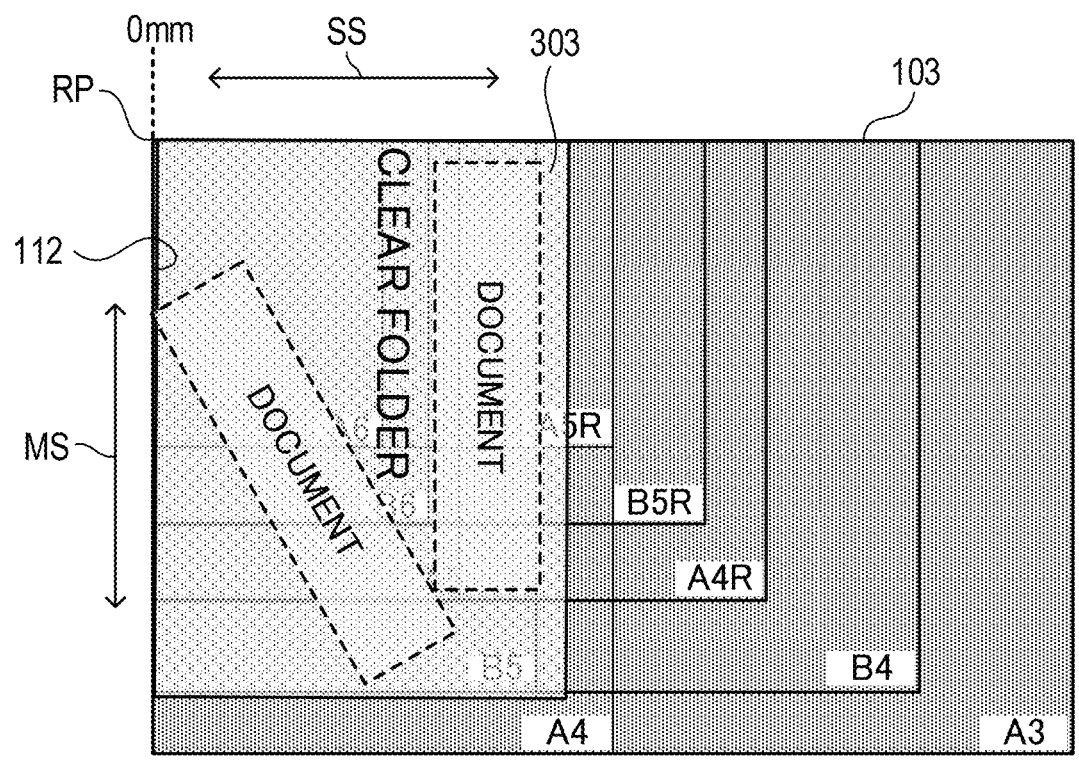
FIG. 11 is a view showing a B5 size clear set placed on the platen glass.

FIG. 11 is a view showing a B5 size clear set 303 placed on the platen glass 103. Whether the B5 size clear set 303 is placed on the platen glass 103 in the vertical placement (main scanning direction=H) or in the horizontal placement (main scanning direction=W), the clear set 303 does not extend out beyond the readable range of the image reading apparatus 1005. Therefore, instead of the operation instruction screen 14 shown in FIG. 5D, the CPU 2001 displays a screen that prompts the user to start without instructing the user to place the clear set 303 in the horizontal placement.

FIG. 12A and FIG. 12B are views showing operation instruction screens 18 and 19 in the clear set mode. The CPU 2001 causes the operation display unit 2002 to display the operation instruction screen 18 that prompts the user to press the start key regardless of whether the clear set 303 is placed in the vertical placement or in the horizontal placement, as shown in FIG. 12A. At this time, in the case in which the binding holes "YES" is set, the CPU 2001 may cause the operation display unit 2002 to display a screen showing only the orientation of the binding hole portion. Alternatively, a screen indicating the orientation of the clear set 303 need not be displayed.

Then, in a case in which the corresponding document size "A3" is selected by the corresponding document size setting button 703, a length W of 310 mm (W=310) of the short side and a length H of 435 mm (H=435) of the long side are set as the internal information of the reading range from FIG. 9A. A dimension range (reading range) of a clear set is set as follows according to the selection of the binding hole "YES" or "NO" by the binding hole setting button 704.

(1) In a case in which the binding holes "NO" is selected by the binding hole setting button 704, the length W of the short side of the dimension range of the clear set is set to 310 mm and the length H of the long side is set to 435 mm.

(2) In a case in which the binding holes "Yes" is selected by the binding hole setting button 704, the length W of the short side of the dimension range of the clear set is set to 320 mm (310+10) and the length H of the long side is set to 430 mm (435−5).

In a case in which the corresponding document size "A3" is selected, the vertical placement is "×" and the horizontal placement is "Δ" from FIG. 9A. The symbol "Δ" means that the clear set can be placed by displaying a warning to the user even though the clear set extends out beyond the readable range. Even when a clear set of the A3 size is placed in the horizontal placement, the maximum value of the length W (320 mm in the case of the binding holes "YES") of the short side extends out beyond the readable range, so the "horizontal placement" is essentially supposed to be "×" (not possible). However, the dimension range of the clear set of the A3 size is almost the same as the entire surface of the platen glass 103, and the requirement to use the clear set of the A3 size is high. Therefore, in the case in which the corresponding document size "A3" is selected, as shown in FIG. 12B, the operation instruction screen 19 is displayed to prompt the user to place the clear set in the horizontal placement and to warn the user not to allow a document in the clear set to extend out beyond the readable range.

In the embodiment, the reading range in the clear set mode is set by the user setting in advance the dimension range of the clear set through the operation display unit 2002. However, the method of setting the dimension range (reading range) of the clear set is not limited to this. For example, a manufacturer model number information of a commercially available clear file used as a clear set may be read by a bar code or the like, and the outer dimension of the clear file may be retrieved based on the manufacturer model number information to set the dimension range (reading range). Alternatively, the image reading apparatus 1005 may be configured to operate in a dimension detection mode to detect the outer dimension of the clear set, and the dimension range of the clear set may be set based on the detection result of the outer dimension of the clear set placed on the platen glass 103.

As described above, in the clear set mode, the image reading apparatus 1005 according to the embodiment can properly read small-sized thin paper documents in the clear set placed on the platen glass 103. In the clear set mode, a screen instructing the orientation of the clear set is switched to a screen showing the orientation corresponding to the dimension range according to the dimension range of the clear set, and an operation instruction screen instructing the user how to place the clear set is displayed on the operation display unit. Therefore, it is possible to provide the image reading apparatus 1005 with the multi-crop function that reads an appropriate range for documents tucked in a clear set such as a commercially available clear file and outputs image data of the documents. According to the embodiment, a clear set can be read with an appropriate reading range and image data of documents tucked in the clear set can be output. According to the embodiment, it is possible to display the screen indicating the orientation in which the storage member in which the documents are tucked is to be placed on the document platen.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-199605, filed Dec. 8, 2021, which is hereby incorporated by reference herein in its entirety.

What is claimed is:

1. An image reading apparatus, comprising:
a transparent document platen on which a document is to be placed;
a reader configured to read an image of the document placed on the document platen;
a controller configured to perform a reading mode to cause the reader to read a document tucked in a storage member, which has a transparent portion and can store the document, in a state in which the storage member in which the document is tucked is placed on the document platen so that the transparent portion contacts the document platen; and
a display configured to display, in the reading mode, a screen indicating an orientation in which the storage member is to be placed on the document platen,
wherein in a case in which the storage member has a document unsettable portion tucked, the lay displays the screen indicating the orientation in which the storage member is to be placed on the document platen so that the document unsettable portion is in a predetermined placement.

2. The image reading apparatus according to claim 1, wherein the orientation in which the storage member is to be placed on the document platen is an orientation in which the storage member is placed on the document platen without extending out beyond a readable range of the document platen.

3. The image reading apparatus according to claim 1, wherein the screen indicating the orientation is switched to a screen indicating an orientation corresponding to a dimension range of the storage member according to the dimension range.

4. The image reading apparatus according to claim 2, wherein in a case in which the storage member has a dimension range such that the storage member can be placed on the document platen without extending out beyond the readable range regardless of the orientation in which the storage member is to be placed on the document platen, the screen indicating the orientation is not displayed on the display.

5. The image reading apparatus according to claim 1, wherein the predetermined placement is a placement in which the document unsettable portion is positioned on a side opposite to a reference position for an image reading operation.

6. The image reading apparatus according to claim 1, wherein the predetermined placement is a placement in which the document unsettable portion is positioned on a side of a reference position for an image reading operation.

7. The image reading apparatus according to claim 1, wherein the reading mode is a mode in which one or more images of one or more documents stored in the storage member are read and image data for each document is output.

8. The image reading apparatus according to claim 7, wherein the image reading apparatus is operable in a second reading mode in which one or more documents placed directly on the document platen without using the storage member are read and image data for each document is output, and
wherein the image reading apparatus switches a reading range for detecting the one or more documents between a first reading mode, which is the reading mode, and the second reading mode.

9. The image reading apparatus according to claim 8, wherein in the first reading mode, the reading range is determined according to a dimension range of the storage member, and
wherein in the second reading mode, the reading range is an entire surface of the document platen.

10. An image forming apparatus comprising:
a transparent document platen on which a document is to be placed;
a reader configured to read an image of the document placed on the document platen;
a controller configured to perform a reading mode to cause the reader to read a document tucked in a storage member, which has a transparent portion and can store the document, in a state in which the storage member in which the document is tucked is placed on the document platen so that the transparent portion contacts the document platen,
a display configured to display, in the reading mode, a screen indicating an orientation in which the storage member is to be placed on the document platen; and
an image forming unit configured to form an image on a recording medium according to image data read by the reader,
wherein in a case in which the storage member has a document unsettable portion in which the document cannot be tucked, the display displays the screen indicating the orientation in which the storage member is to be placed on the document platen so that the document unsettable portion is in a predetermined placement.

* * * * *